(12) United States Patent
Bailleux

(10) Patent No.: US 6,644,603 B2
(45) Date of Patent: Nov. 11, 2003

(54) BRACKET FOR SUPPORTING AND CLASPING AN OPEN WIRE CHANNEL FOR CABLES AND THE LIKE

(75) Inventor: Jacques Bailleux, Autun (FR)

(73) Assignee: Gewiss France SA, Liernais (FR)

( * ) Notice: Subject to any disclaimer, the term of this patent is extended or adjusted under 35 U.S.C. 154(b) by 0 days.

(21) Appl. No.: 10/025,921

(22) Filed: Dec. 26, 2001

(65) Prior Publication Data

US 2002/0079408 A1 Jun. 27, 2002

(30) Foreign Application Priority Data

Dec. 27, 2000  (FR) .............................................. 00 17118

(51) Int. Cl.⁷ .............................................. E21F 17/02
(52) U.S. Cl. .............................. 248/65; 248/49; 248/61; 248/68.1; 248/302
(58) Field of Search ............................ 248/49, 61, 65, 248/68.1, 302; 211/106, 119

(56) References Cited

U.S. PATENT DOCUMENTS

| | | | |
|---|---|---|---|
| 4,842,230 A | * | 6/1989 | Cobb et al. ................. 211/106 |
| 6,082,690 A | | 7/2000 | Durin |
| 6,234,330 B1 | * | 5/2001 | Gray ........................... 211/103 |
| 2002/0047073 A1 | * | 4/2002 | Deciry et al. ................. 248/49 |

FOREIGN PATENT DOCUMENTS

| | | | |
|---|---|---|---|
| EP | 0579929 A1 | * | 1/1994 |
| FR | 2716242 | | 8/1995 |
| GB | 2301951 | | 12/1996 |

* cited by examiner

Primary Examiner—Leslie A. Braun
Assistant Examiner—Ingrid Weinhold
(74) Attorney, Agent, or Firm—Dowell & Dowell, P.C.

(57) ABSTRACT

A bracket for supporting an open wire channel for cables or the like wherein the bracket is formed from a sheet of metal and includes a part for supporting the channel and first and second clip members for laterally holding the channel and which clip members extend upwardly beyond the supporting part on opposite sides thereof and which clip members are secured by elastic deformation relative to sides of the channel.

10 Claims, 3 Drawing Sheets

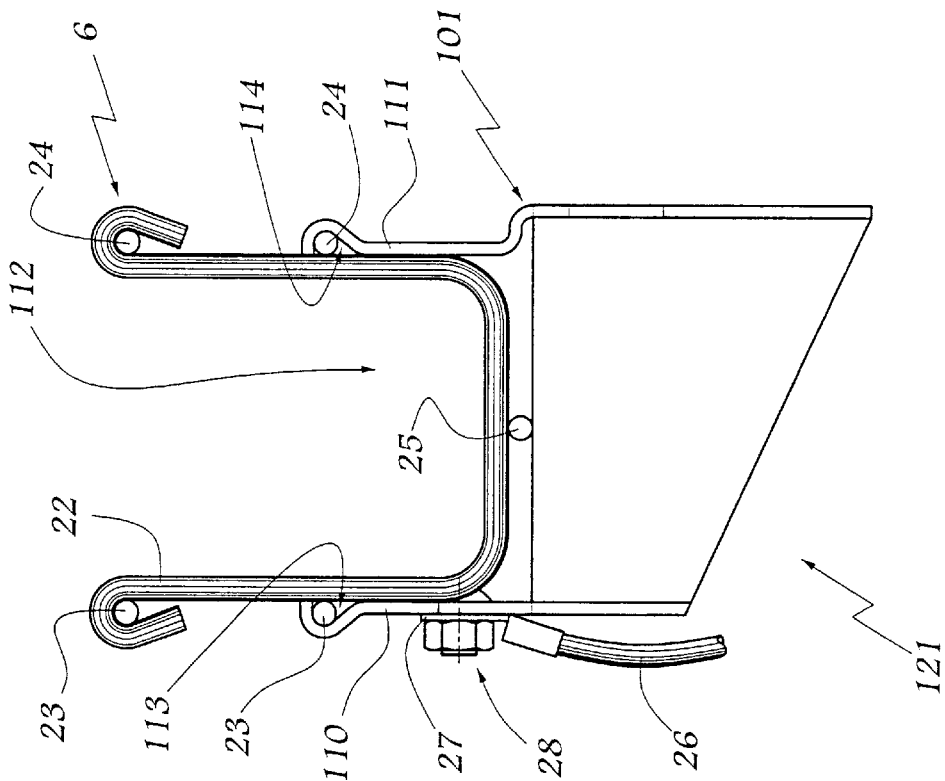
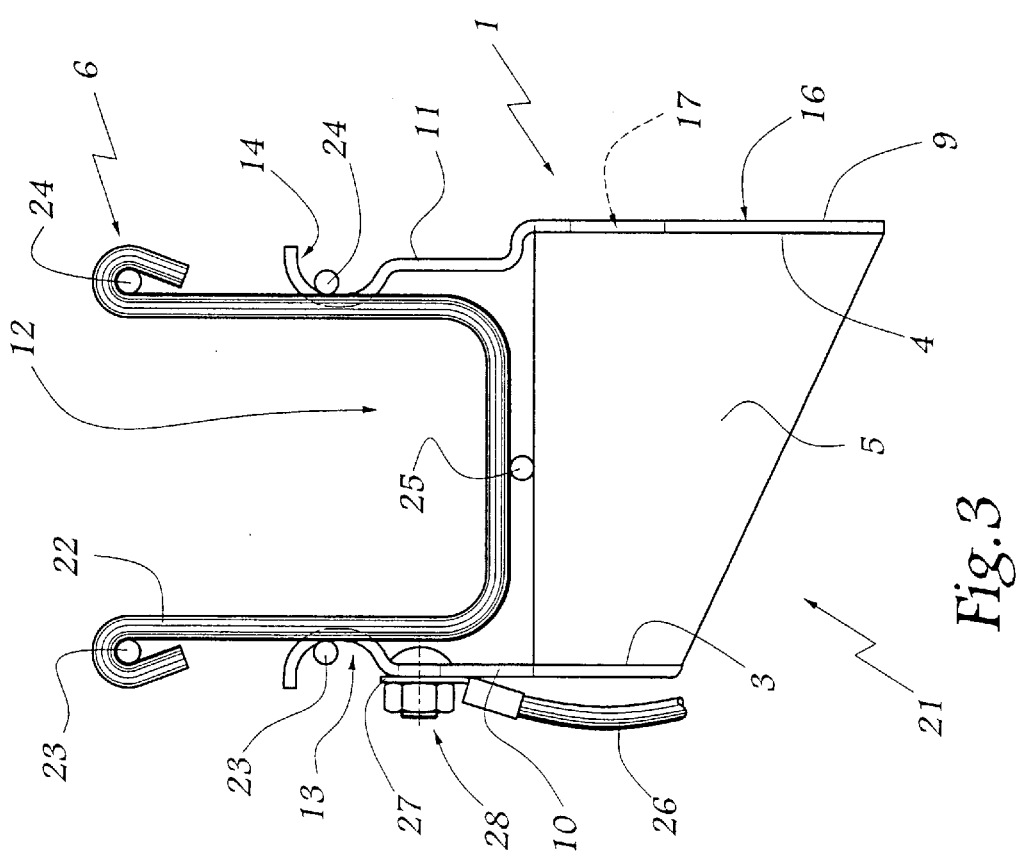
Fig. 4
Fig. 3

BRACKET FOR SUPPORTING AND CLASPING AN OPEN WIRE CHANNEL FOR CABLES AND THE LIKE

BACKGROUND OF THE INVENTION

1. Field of the Invention

The invention relates to a bracket for supporting and elastically retaining a channel for cables or the like formed by wires or rods.

2. Discussion of the Related Art

It is known, for example from document FR-A-2 687 207, to make a cable channel by joining longitudinal wires or rods with generally u-shaped cross wires or rods. This channel is generally supported either by angle irons or by brackets, which may be fixed directly to a wall or mounted on vertical bars for supporting a plurality of channels above one another. In order to fix welded wire channels on such brackets or angle irons, it is known to use bolts or clips of which an example is found in document FR-B1-2 716 242.

Although such cable channels are fully satisfactory in many respects, the present applicants are continually improving them.

It is a particular object of the present invention to reduce the overall cost of a channel for cables or the like formed by wires or rods.

SUMMARY OF THE INVENTION

To that end, the invention relates to a bracket for supporting an open wire or rod channel for cables or the like formed by a plurality of longitudinal wires or rods and cross member wires or rods which are welded together. The bracket is formed from a sheet of metal and includes a part for supporting the cable channel and first and second clip members for laterally holding or grasping the cable channel. The clip members which are formed in the sheet of metal so as to extend upwardly beyond the supporting central part, are secured to the open channel by elastic deformation relative to the sides of the channel.

The clip members are curved in two opposite directions to laterally grasp or engage wires or rods of the channel. In a preferred embodiment, the two grasping surfaces are parallel to each other and turned in two opposite directions.

The bracket includes two substantially vertical folds which define the supporting part therebetween, and, beyond which are first and second opposite flanges which extend upwardly and form the first and second clip members, respectively. The first flange further forms a base for securing the bracket to a vertical wall or support. The base has at least one hole for the passage of a screw for fixing the bracket to a support. Opposite the hole or opening in the base, the second flange includes a notch for passage of a tool directed towards the hole.

The first clip member is offset with respect to the base, towards the second clip member. In one embodiment, the grasping surfaces face outwardly of the bracket, while in a second embodiment, the grasping surfaces face inwardly of the bracket.

The invention also relates to a device for making a channel for cables or the like including at least one bracket and a channel made of welded wires or rods comprising a bottom and first and second sides. The bracket is such as defined hereinabove, wherein the clip members are able to be inserted by elastic deformation between side wires of the channel in order to retain the channel on the supporting part of the bracket.

The invention also relates to a device for making a channel for cables or the like including at least one bracket and a channel made of welded wires or rods comprising a bottom and first and second sides. The bracket is as defined hereinabove, and the side wires of the channel are able to be inserted by elastic deformation between the clip members of the bracket in order to be retained thereby with the channel on the supporting part of the bracket.

BRIEF DESCRIPTION OF THE DRAWINGS

The invention will be more readily understood on reading the following description given by way of example and made with reference to the accompanying drawings, in which:

FIG. 3 is a view in elevation of the device of FIG. 2; and

FIG. 4 is a view similar to that of FIG. 3 and showing another embodiment of the invention.

DESCRIPTION OF PREFERRED EMBODIMENTS

Figure 1:
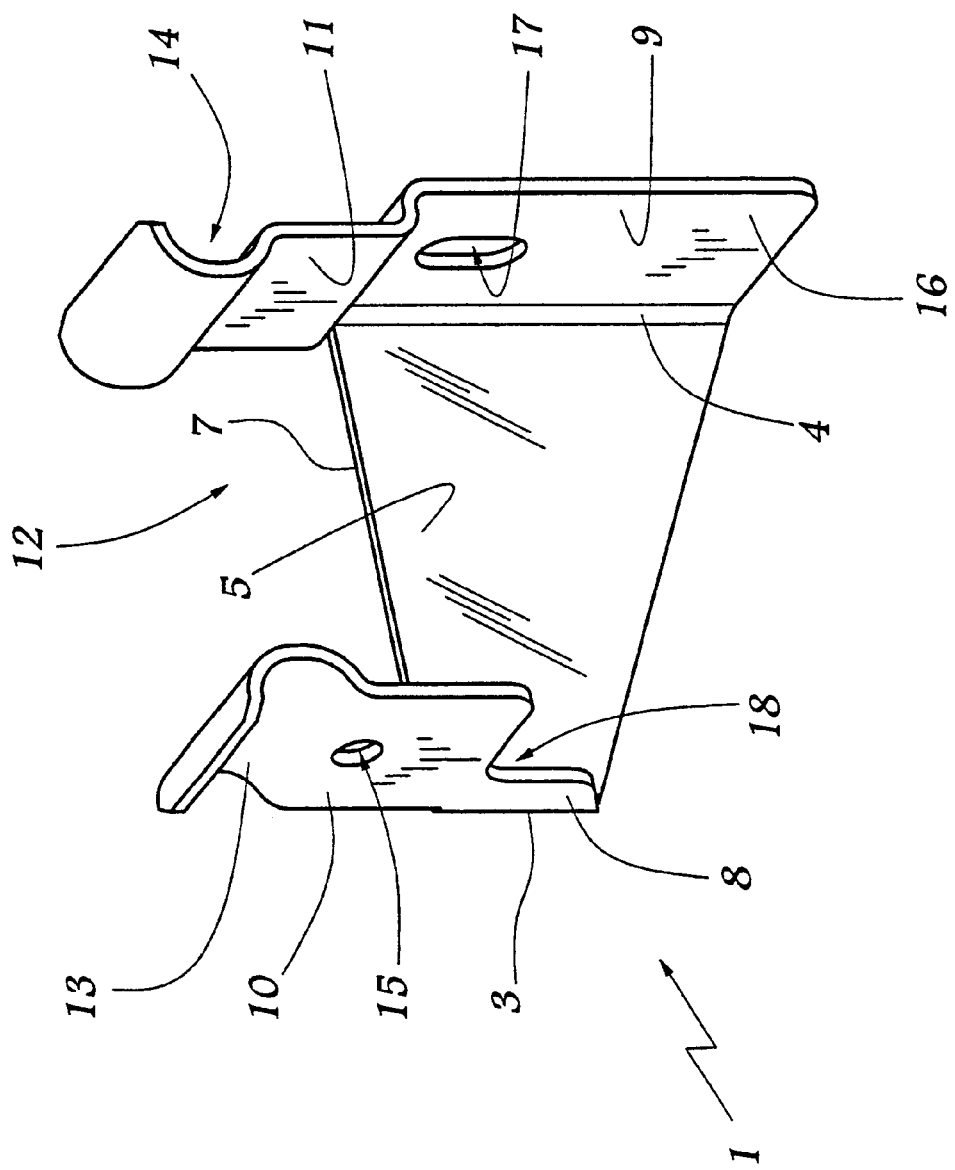
FIG. 1 is a view in perspective of a bracket according to the invention.

Referring now to the drawings, a bracket 1 according to the invention is shown in FIG. 1 in its position for supporting an open channel 6 for cables or the like.

Figure 2:
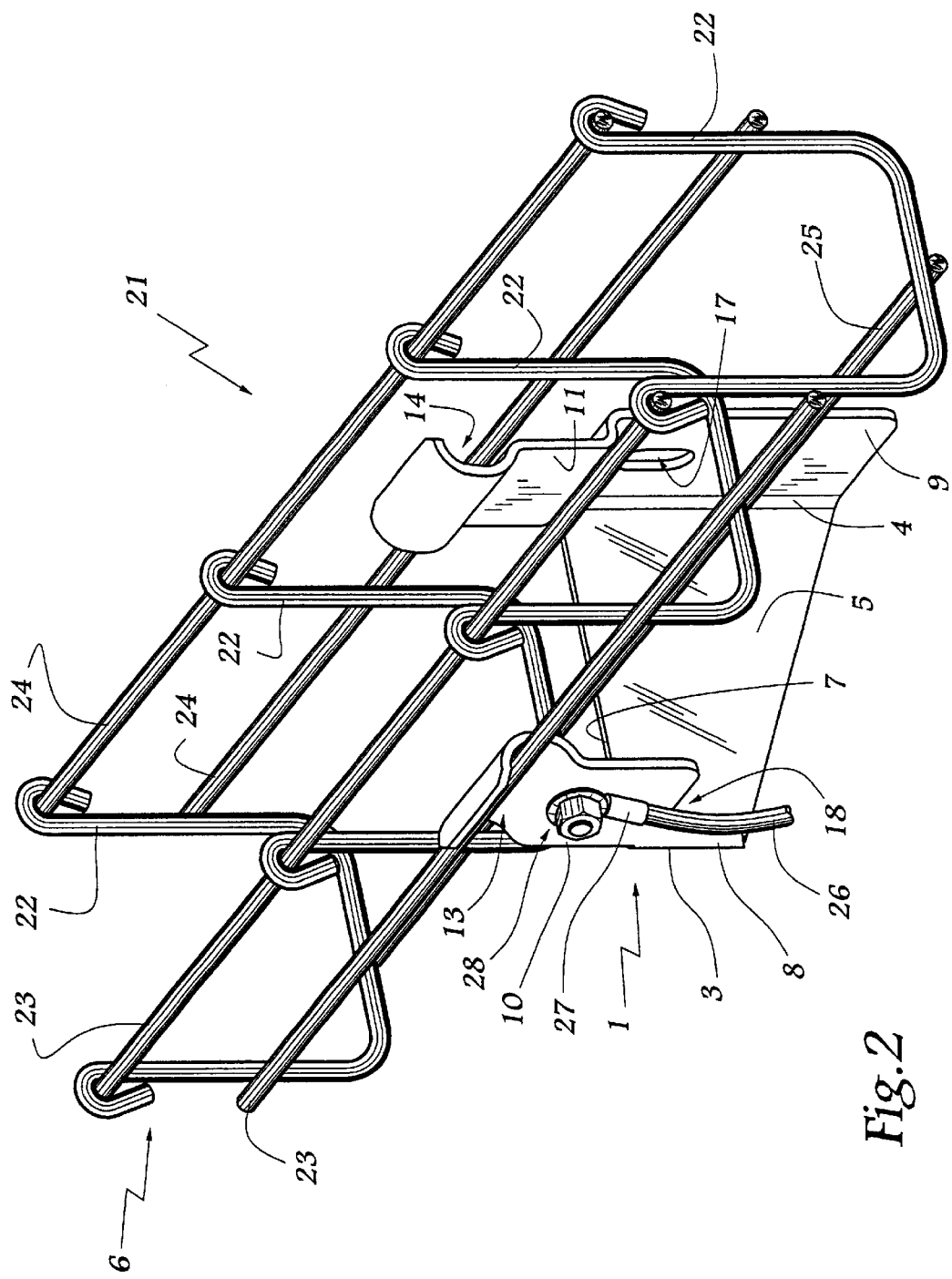
FIG. 2 is a view in perspective of a device according to the invention comprising a channel made of welded wire, shown partially, and mounted on the bracket of FIG. 1.

The bracket 1 is in one piece, obtained by shaping a sheet of metal. Two vertical folds 3 and 4 are formed therein so that the bracket 1 is substantially U-shaped, of which a central part 5, which is trapezoidal, forms a support for the channel 6 which is formed of welded wire rods, as shown in FIGS. 2 to 4 and which channel is seated on an upper edge 7 of the supporting part 5.

Beyond the folds 3 and 4, the bracket includes a short flange 8 and a long flange 9 which are opposite each other and in parallel relationship. The flanges extend at right angles from a narrow end and a wide end, respectively, of the supporting part 5. Upper portions of flanges 8 and 9 project upwardly from the edge 7 and are shaped to form two substantially parallel clips 10 and 11 for laterally engaging and holding the open channel 6. The clips 10 and 11 define an opening 12 therebetween of a size to permit the open channel to be positioned therebetween.

The clips 10 and 11 include arcuate or insert grasping surfaces 13 and 14 which face outwardly with respect to the opening 12. The clip 10 also includes a circular hole 15 for passage of a shank of a bolt 28 for attaching a grounding cable 26.

A portion of the flange 9 located beneath the clip 11 forms a base 16 for fixing the bracket 1 on a vertical support or wall, and is provided with an oblong slot 17 intended for passage of a shank of a screw (not shown) for securing the bracket 1. Opposite the slot 17, the flange 8 includes a notch 18 for passage of a tool, such as a screwdriver, for use in manipulating a screw for securing the bracket 1 to a support.

The clip 11 is offset with respect to the base 16, in a direction of the clip 10, by a shoulder. Once mounted on the bracket 1, the open channel 6 is consequently offset from the wall or support on which the base 16 is secured, this facilitating, in particular, the positioning of a cover (not shown) on the channel.

The device 21 of FIGS. 2 and 3 includes a bracket 1 and an open channel 6 which is clipped on the bracket 1. Within the meaning of the invention, the term clipping denotes a fastening or fit obtained by elastic deformation or snap fitting.

The channel 6, which is known per se, is formed by metal wires or rods welded to form a rigid assembly. Cross wires 22 are substantially in the form of a U whose arms form part of two sides of the channel 6 and whose base forms part of a bottom thereof.

The cross wires are connected to wires which are directed lengthwise of the channel 6. Reference 23 denotes wires which extend along one side of the channel, reference 24 denotes wires which extend along the other side of the channel, and reference 25 denotes a wire extending along the bottom thereof.

The clips 10 and 11 are shown in FIGS. 1–3 inserted between two wires 23 and 24 by elastic deformation of the clips and/or of the wires 23 and 24, respectively, which wires are received in the grasping surfaces 13 and 14 which hold the channel securely.

The wire 25 which rests on the upper edge 7 of the bracket, transmits to the supporting part 5 most of the weight of the open cable channel and its contents (not shown), the grasping surfaces 13 and 14 taking up only a small portion of that weight.

Particularly when the open cable channel is intended to receive electric cables, it may be connected to ground by means of the cable 26 of which one end is provided with a terminal 27. The latter is fixed on the bracket 1 by the bolt 28 of which the shank is threaded in hole 15.

The device 121 shown in FIG. 4 comprises a channel 6 and a bracket 101 in accordance with a variant embodiment of the invention. The elements of this bracket 101 are given the references of like elements of the previous embodiment, increased by 100. The grasping surfaces 113 and 114 of the bracket 101 still face in two opposite directions, but towards each other and no longer outwardly with respect to the opening 112. Therefore the wires of the channel 6 are clipped, by elastic deformation between the clips 110 and 111.

The invention makes it possible to attain the object mentioned hereinabove. Firstly, it saves on the pieces necessary for fixing the cable channels on the supports of the prior art. Moreover, the management and storage costs for the manufacturer, the salesmen and fitters of such fixing pieces are also eliminated. In addition, the invention is simple and the cable channel is rapidly placed on the brackets by elastic deformation, thus leading to a reduction in the fitting time, hence further saving.

Certain additional features also lead to savings. In particular, the shape of the bracket 1 renders it strong, while making it simple, and consequently inexpensive, to manufacture; in addition, little material is required for manufacturing the bracket.

What is claimed is:

1. A Bracket for supporting an open wire channel for cables, wherein the channel includes a bottom and opposite sides, the bracket including a body formed from a sheet of metal and having a supporting part for supporting the bottom of the channel and first and second members for laterally engaging and holding the opposite sides of the channel by elastic deformation, said first and second members extending upwardly beyond said supporting part and on opposite sides thereof, said body including two substantially vertical folds which define said supporting part therebetween and beyond which are first and second opposite flanges, said opposite flanges being terminated upwardly by said first and second members, respectively, and said first flange further forming a base for securing the bracket to a support.

2. The bracket of claim 1, wherein each of said first and second members includes a clip, said clips being curved in opposite directions, each of said clips being formed for receiving a wire extending longitudinally along a side of the open wire channel.

3. The bracket of claim 1, wherein said base has at least one opening for passage of a fastener for securing the bracket to the support.

4. The bracket of claim 3, wherein, opposite said opening in said base, said second flange includes a notch to permit passage of a tool directed towards said opening.

5. The bracket of claim 1, wherein said first member includes a portion which is offset with respect to said base towards said second member.

6. The bracket of claim 1 wherein each of said first and second members for laterally engaging includes a concave surface grasping portion adapted to engage a wire extending along one of the sides of the open wire channel, and said concave surface grasping portions being parallel with respect to one another and oriented in opposite directions.

7. The bracket of claim 6 wherein said concave grasping surfaces of said first and second members are oriented outwardly relative to said supporting part.

8. The bracket of claim 6 wherein said concave grasping surfaces of said first and second members are oriented towards one another.

9. A device for supporting cables comprising, at least one bracket and a channel made of open mesh wire, said channel being generally u-shaped in cross section including a bottom and opposite sides, each of said opposite sides having at least one longitudinal wire extending there along which are secured to cross wires, said at least one bracket including a body formed from a sheet of metal having a supporting part for supporting said bottom of said channel and first and second members laterally engaging and grasping said opposite sides of said channel, said first and second members extending upwardly beyond said supporting part and on opposite sides thereof, and each of said first and second members engaging a wire on opposite sides of said channel by elastic deformation when said bottom of said channel rests on said supporting part of said bracket.

10. A device for supporting cables comprising, at least one bracket and a channel made of open mesh wire, said channel being generally u-shaped in cross section including a bottom and opposite sides, each of said opposite sides having at least one longitudinal wire extending there along which are secured to cross wires, said at least one bracket including a body formed from a sheet of metal having a supporting part for supporting said bottom of said channel and first and second members laterally engaging and holding said opposite sides of said channel, said first and second members extending upwardly beyond said supporting part and on opposite sides thereof, and each of said first and second members engaging a wire on opposite sides of said channel by elastic deformation when said bottom of said channel rests on said supporting part of said bracket.

* * * * *